(12) United States Patent
Ito

(10) Patent No.: US 9,620,299 B2
(45) Date of Patent: Apr. 11, 2017

(54) CAPACITOR

(71) Applicant: Panasonic Intellectual Property Management Co., Ltd., Osaka (JP)

(72) Inventor: Yasuyuki Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 79 days.

(21) Appl. No.: 14/521,262

(22) Filed: Oct. 22, 2014

(65) Prior Publication Data
US 2015/0116907 A1    Apr. 30, 2015

(30) Foreign Application Priority Data

Oct. 31, 2013    (JP) .................................. 2013-226200

(51) Int. Cl.
*H01G 9/042*    (2006.01)
*H01G 11/62*    (2013.01)
*H01G 11/24*    (2013.01)
*H01G 11/32*    (2013.01)
*H01G 11/58*    (2013.01)

(52) U.S. Cl.
CPC ............. *H01G 11/62* (2013.01); *H01G 11/24* (2013.01); *H01G 11/32* (2013.01); *H01G 11/58* (2013.01); *Y02E 60/13* (2013.01)

(58) Field of Classification Search
CPC ........ H01G 9/058; H01G 9/042; H01G 9/155; H01G 9/038
USPC ........ 361/502, 503–504, 509–512, 516–519, 361/523–529
See application file for complete search history.

(56) References Cited

U.S. PATENT DOCUMENTS

| | | | | |
|---|---|---|---|---|
| 2007/0002522 A1* | 1/2007 | Takeda | .................. | H01G 9/038 361/502 |
| 2011/0160038 A1* | 6/2011 | Fujii | ..................... | C01B 31/02 502/1 |

FOREIGN PATENT DOCUMENTS

JP    2001-217150    8/2001

* cited by examiner

*Primary Examiner* — Nguyen Ha
(74) *Attorney, Agent, or Firm* — McDermott Will & Emery LLP

(57) ABSTRACT

A capacitor includes a capacitor element and an electrolyte containing a lactone compound. At least one of a positive electrode and a negative electrode of the capacitor element contains activated carbon Entire surface functional group amount D (meq/g/nm$^2$) in an average sectional area of pores of the activated carbon is calculated at 0.152 or less by the following equation:

$$D = F/S$$

where F represents an entire surface functional group amount per unit weight (meq/g) of the activated carbon, and S represents an area (nm$^2$) of a circle of which diameter is an average diameter of the pores of the activated carbon.

4 Claims, 2 Drawing Sheets

CAPACITOR

BACKGROUND

1. Technical Field

The present disclosure relates to capacitors to be used in a variety of electronic devices or in storage battery units for vehicles.

2. Background Art

An electric double layer capacitor makes use of a storage function of an electric double-layer formed on an interface between a polarized electrode and an electrolyte. In general, the electric double layer capacitor includes a pair of polarized electrodes (positive electrode and negative electrode), an electrolyte, a porous separator, a pair of current collectors, and a container accommodating the foregoing structural elements. The pair of polarized electrodes is impregnated with the electrolyte. The separator isolates the pair of polarized electrodes from each other for preventing them from shorting with each other. Current collectors are coupled to the polarized electrodes, respectively.

The electric double layer capacitor discussed above features the following advantages over a secondary battery:
 a longer service life, and no replacement needed;
 capability of being charged instantaneously; and
 capability of discharging a greater amount of electric current.

Due to these advantages, the electric double layer capacitor has drawn attention from the market in recent years as a load leveling power supply or a back-up power supply when the electric double layer capacitor is combined with another power supply.

In order to use the electric double layer capacitor in a high-temperature atmosphere, it has been studied to adopt an electrolyte of being excellent in heat resistance and of generating a smaller amount of gasses. An adoption of an electrolyte containing γ-butyl-lactone or γ-valero-lactone is proposed as an example of the foregoing electrolyte.

SUMMARY

A long-life capacitor of the present disclosure is formed of a capacitor element and an electrolyte containing a lactone compound. The capacitor element includes a positive electrode and a negative electrode confronting the positive electrode. The capacitor element is impregnated with the electrolyte. At least one of the positive electrode and the negative electrode contains activated carbon. Entire surface functional group amount D (meq/g/nm$^2$) at an average sectional area of pores of this activated carbon is calculated at 0.152 or less by the following equation:

$$D=F/S$$

F: an entire surface functional group amount per unit weight (meq/g) of the activated carbon, and
S: an area (nm$^2$) of a circle of which diameter is an average diameter of the pores of the activated carbon

DETAILED DESCRIPTION OF PREFERRED EMBODIMENT

Prior to describing the embodiment of the present disclosure, problems of a conventional electric double layer capacitor are described briefly. Use of an electrolyte that includes a solvent containing γ-butyl-lactone or γ-valero-lactone has proved that gasses are reduced; however, the capacitor, which employs an electrolyte formed of a solvent containing a lactone compound such as γ-butyl-lactone, is often subjected to a long time charge/discharge under a harsh environment such as a quick charge/discharge. Aged deterioration of this capacitor thus needs to be improved.

Figure 1:
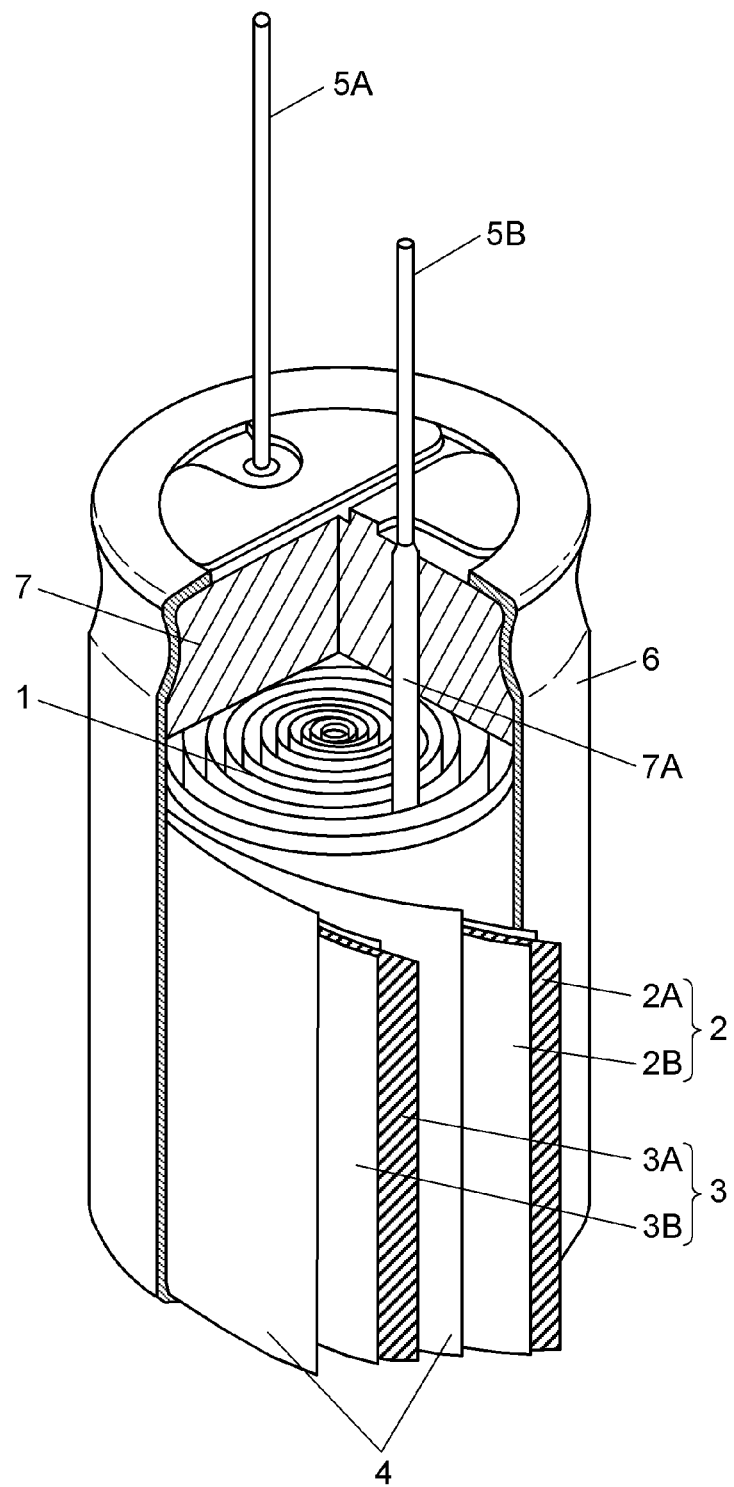
FIG. 1 is a partially cut-away perspective view showing a structure of a capacitor in accordance with a first embodiment of the present disclosure.

FIG. 1 is a partially cut-away perspective view showing a structure of a capacitor in accordance with the embodiment of the present disclosure. This capacitor includes capacitor element 1 and an electrolyte (not shown) containing a lactone-compound. Capacitor element 1 includes positive electrode 2 and negative electrode 3 confronting positive electrode 2. Capacitor element 1 is impregnated with the electrolyte. An electric double layer capacitor is demonstrated hereinafter as an example of the capacitor in accordance with the embodiment.

Positive electrode 2 includes metallic current collector 2A and electrode layer 2B that is formed on the surface of collector 2A and capable of absorbing and desorbing ions. Collector 2A is connected with lead-wire 5A as a leading member. In a similar way, negative electrode 3 includes metallic current collector 3A and electrode layer 3B that is formed on the surface of collector 3A and capable of absorbing and desorbing ions. Collector 3A is connected with lead-wire 5B as a leading member. As detailed later, electrode layers 2B and 3B contain activated carbon.

Capacitor element 1 is formed by confronting positive electrode 2 and negative electrode 3 each other, and winding positive electrode 2 and negative electrode 3 with separator 4 between positive electrode 2 and negative electrode 3. Capacitor element 1 and the electrolyte are accommodated in a bottomed outer case 6, and sealing member 7 seals an opening end of case 6 such that lead-wires 5A and 5B are exposed.

Next, the materials for positive electrode 2 and negative electrode 3 are demonstrated hereinafter. Collectors 2A and 3A are made of, for instance, high purity aluminum foil (Al content of the foil is 99% or more) having a thickness of approx. 15 μm. This aluminum foil is subjected to an electrolytic etching in chlorine-based etching solution in advance, whereby the surface of the aluminum foil is roughened.

Electrode layers 2B and 3B are formed on both the top faces and the undersides of collectors 2A and 3A, respectively. These electrode layers contain activated carbon, binding agent, and conduction assistant. The activated carbon is, for instance, phenol resin-based activated carbon, and has an average particle diameter of approx. 1-10 μm. Instead of this material, carbon material prepared from coconut shell, wood powder, paper, petroleum coke, or petroleum pitch can be used. A specific surface area of the activated carbon influences on capacitance per unit area, so that the specific surface area thereof is preferably 1500 m$^2$/g or more. The binding agent employs, for instance, butadiene-styrene rubber, carboxymethyl-cellulose (CMC), and the conduction assistant employs, for instance, carbon black such as acetylene black.

The solute of the electrolyte employs, for instance, diethyldimethyl-ammonium-tetrafluoroborate (DEDMA+$BF_4^-$) which is one of quaternary ammonium salts. Anion of the solute preferably contains fluorine atoms in view of withstanding voltage characteristics, and more preferably contains $BF_4^-$ or $PF_6^-$. A solvent employs, for instance, an organic solvent (e.g. γ-butyrolactone), and is mixed with the solute so as to obtain a concentration of the solute at 0.5-2.0 mol/liter.

Separator 4 employs, for instance, cellulose-based paper having approx. 35 μm thickness and 0.45 g/cm$^3$ density. Instead of the paper, fluoro-material such as polytetrafluoroethylene can be employed.

Outer case 6 preferably employs metal, for instance, aluminum, copper, or nickel in view of heat dissipation. However, the material for case 6 needs not to be limited to a specific one if the material thereof is hard to react with the electrolyte. In other words, case 6 can be made of resin. A shape of case 6 is not limited to a cylindrical shape, but it can be prismatic or laminated shape.

Sealing member 7 is formed of, for instance, butyl rubber; however, the material for sealing member 7 is not specifically limited to butyl rubber as long as the material is formed of elastic rubber, and this elastic rubber is hard to react or swell with the electrolyte.

Next, a procedure of manufacturing positive electrode 2 and negative electrode 3 is demonstrated. First, the foregoing activated carbon, conduction assistant, and binding agent are mixed together at a weight percentage of approx. 12:1:1. Then this mixture is kneaded with a kneader, and its viscosity is adjusted at a given value, thereby preparing paste.

This paste is applied onto the top faces and undersides of collectors 2A and 3A, and then the applied paste is dried in ambient atmosphere of 100° C., whereby, an intermediate body, which includes electrode layers 2B, 3B of 40 μm thickness formed on the top faces and undersides of collectors 2A, 3A, is obtained. The thickness is measured at each face of collectors 2A and 3A. Then this intermediate body is slit at given widths.

Then parts of electrode layers 2B, 3B are removed from the top faces and the undersides of collectors 2A, 3A, and lead-wires 5A, 5B are connected to the exposed portions of collectors 2A, 3A, respectively, by a needle-crimping method or the like. Positive electrode 2 and negative electrode 3 can be thus completed.

Next, an assembling procedure of the capacitor in accordance with the embodiment is demonstrated hereinafter. First, positive electrode 2 is placed confronting negative electrode 3, and separator 4 is placed between positive electrode 2 and negative electrode 3, then the resultant unit is wound to form capacitor element 1. Then capacitor element 1 is impregnated with an electrolyte. The method of impregnation can be selected from known methods.

Lead-wires 5A, 5B projecting from capacitor element 1 discussed above are extended into through-holes 7A provided in sealing member 7. Sealing member 7 kept in this condition is disposed to an opening of bottomed outer case 6, and then a drawing process is provided to case 6 at the outer wall of the opening toward the inside of case 6. A curling process is also provided to an end section of the opening of case 6. The foregoing processes allow fixing the sealing member 7 to case 6 through crimping and gripping.

Thus, the opening of case 6 is completely sealed. The capacitor in accordance with the embodiment is thus completed.

The capacitor in accordance with the embodiment includes the electrolyte containing the lactone compound, and the activated carbon forming positive electrode 2 and negative electrode 3 has pores. A feature built in this capacitor is this: At an average section of the pores, entire surface functional group amount D (meq/g/nm$^2$) is calculated at 0.152 or less by equation (1):

$$D=F/S \quad (1)$$

where F represents an entire surface functional group amount per unit weight (meq/g) of the activated carbon, and S represents an area (nm$^2$) of a circle of which diameter is an average diameter of the pores of the activated carbon.

In the following description, entire surface functional group amount F per unit weight of the activated carbon is simply referred to as functional group amount F, and entire surface functional group amount D is simply referred to as functional group amount D.

The insides of pores of the activated carbon forming positive electrode 2 and negative electrode 3 of capacitor element 1 are impregnated with the electrolyte, and the electrolyte moves in the pores for ions to migrate, which carries out charging/discharging the capacitor. It is considered that the presence of the surface functional group on inner walls of the pores influences the electrolyte physically or chemically at this time. In the capacitor of this embodiment, functional group amount D is specified (limited), whereby the influence of the surface functional group can be reduced. As a result, the use of lactone compound in the electrolyte allows preventing the characteristics of the capacitor from degrading.

Figure 2:
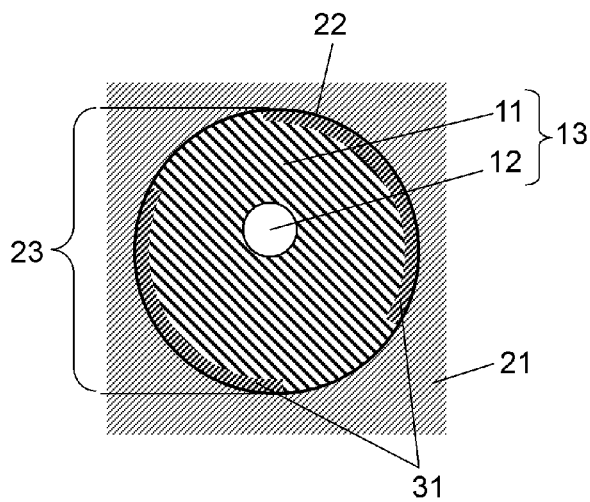
FIG. 2 is a sectional view schematically illustrating an inside of a pore of activated carbon that forms an electrode of the capacitor shown in FIG. 1.

Next, the relationship between the pore condition of the activated carbon in the capacitor and the electrolyte is described with reference to FIG. 2 which schematically illustrates the inside of pore 23 of activated carbon 21 used in the capacitor in accordance with the embodiment.

Pore 23 of activated carbon 21 can be assumed that pore 23 is a prismatic hollow having a given length. Pore 23 is cut along a direction perpendicular to the length direction of the prismatic hollow to show a sectional view thereof. Each of the pores of activated carbon 21 is assumed to have an approx. cylindrical inner wall.

Activated carbon 21 and electrolyte 13 with which activated carbon 21 is impregnated stay in the following condition: inner wall 22 of pore 23 surrounds electrolyte 13 (solvent 11 and ions 12) entering pore 23, and surface functional group 31 exists on a surface of inner wall 22.

The inventors assume that only a reduction in an amount of surface functional group 31 of activated carbon 21 is not enough to prevent the characteristics from degrading during the charge/discharge of the capacitor, and they pay attention how the surface functional group 31 is placed in pore 23.

As shown in FIG. 2s, a specific section of pore 23 is examined to study the condition of pore 23. If pore 23 has a smaller sectional area, ions 12 and solvent 11 of electrolyte 13 have smaller distances to surface function group 31 still remaining only in the surrounding of electrolyte 13 even after the amount of surface functional group 31 is reduced. The remaining surface functional group 31 may influence electrolyte 13 sometimes more strongly in the sectional view than another activated carbon containing a greater amount of the surface functional groups.

In this embodiment, considering the compatibility between a composition of the electrolyte and the surface functional group of the activated carbon, functional group amount D is introduced as a new parameter in order to express an influential degree of the surface functional group to the electrolyte available in the sectional view of the pore. Functional group amount D is thus a new indicator for preventing the characteristics of the capacitor from degrading.

Sectional area S to be used for calculating functional group amount D is found by equation (2).

$$S=\pi \times (d/2)^2 \qquad (2)$$

where "d" represents an average diameter (nm) of the pore.

Functional group amount F (meq/g) and average pore diameter "d" (nm) of the pore are measured by the following methods respectively. Functional group amount F is used for calculating functional group amount D, and average diameter "d" of the pore is used for calculating sectional area S (nm²).

First, the measuring method of amount F is demonstrated hereinafter. The sample of activated carbon is dried in an oven, where the temperature is adjusted at 115° C.±5° C., for three hours or longer, and the resultant sample is left in a desiccator for 20 minutes or longer for cooling. Then an amount of 2 g±0.01 g is taken from the sample. This amount should be as accurate as on the order of 0.1 mg. The sample taken out is put into a conical flask having a stopper and a capacity of 100 cm³, and then aqueous solution of $C_2H_5ONa$ in an amount of 50 cm³ is input into this flask as a reagent. This reagent has a concentration of 0.1 mol/liter. The sample and the reagent are agitated with a stirrer for 2 hours continuously before they are left for 24 hours. Then the sample and the reagent are agitated again with the stirrer for 30 minutes. The sample and the reagent are passed through a filter paper of type 5C, thereby obtaining filtrate. The filter paper of type 5C is used for quantitative analysis of fine precipitate, and has a precipitate retaining characteristic that requires 720 seconds or longer for passing water of 100 cm³.

The filtrate is divided into 25 cm³ each, which is then input in beakers. HCl aqueous solution having a concentration of 0.1 mol/liter is titrated with an automatic titrating device while the filtrate in each beaker is agitated with the stirrer. The titration is ended when the pH of the filtration reaches to 4.0, and a total amount $t_1$ of the titration is measured. Next, the aqueous solution formed of $C_2H_5ONa$ of the same quantity and the same concentration as the foregoing solution but without the sample undergoes the same titration as discussed above, and a total amount t2 of titration until its pH reaches to 4.0 is measured (blank test). Use of the values of t1 and t2 allows calculating functional group amount F through below-mentioned equation (3). In other words, functional group amount F can be found by a reversal titration of $C_2H_5ONa$ in an amount reacting with the activated carbon per unit weight.

$$F=0.1 \times (t2-t1) \qquad (3)$$

The method of measuring average diameter "d" of the pores of the activated carbon is demonstrated hereinafter. The sample of activated carbon of 0.20-0.25 g is put into a measuring cell for specific surface area. The measuring cell is formed of glass tube. This measuring cell undergoes drying and degassing for one hour or longer at a pressure of 6.67 Pa or less and at a temperature 250° C.±5° C. Then, the weight of the sample in the measuring cell is measured as accurate as on the order of 0.1 mg. Thereafter, an amount of nitrogen adsorbing to the sample at temperature of −196° C. is measured with a measuring instrument for specific surface area. Based on the resultant absorbing amount, specific surface area A is found at a partial pressure ranging from 0.001-0.2 by a BET multipoint method. Pore volume V is calculated based on a total absorbing amount of nitrogen to the sample at a partial pressure 0.93. The average diameter "d" of the pores is found by equation (4):

$$d=4V/A \qquad (4)$$

where A represents a specific surface area, and V represents a pore volume.

The average section in this context means the section below: The activated carbon includes numerous pores, and it is assumed that each of the pores is cut perpendicular to an extending direction of the pore to obtain a section, and a section among these sections has a round shape at an opening end (a virtual plane) of the pore. A diameter of this round shape is assumed as the average diameter of the pores.

As discussed above, the value of F found by equation (3) shows an amount of $C_2H_5ONa$ reacting with the activated carbon per unit weight. Most of the functional group existing on the surface of the activated carbon is generated by reacting with oxygen in the air during the manufacturing steps of the activated carbon or while the activated carbon is left in the air. In other words, functional groups containing oxygen such as carbonyl group, carboxyl group, and hydroxyl group exits on the surface of the activated carbon. These functional groups react with $C_2H_5ONa$, so that the value of F can be found by the foregoing method. To be more specific, the value of F shows an amount of the functional groups containing oxygen atoms in the activated carbon per unit weight.

The amount of these functional groups can be controlled by providing the activated carbon with heat treatment after activating the carbon. This heat treatment sometimes changes the pore diameter of the activated carbon. This change will cause changes in the values of F and S, which are used for determining the value of D, through the heat treatment. The condition of the heat treatment thus can control the value of D.

To be more specific, an atmosphere of inactive gas such as nitrogen is kept at 600° C. or higher, and the activated carbon is temporarily subjected to this atmosphere, whereby the value of D is controlled at 0.152 or lower.

Performance Evaluation Test

Hereinafter, a performance evaluation test of the capacitor in accordance with the embodiment and the result thereof is described. Samples A-H of capacitors are prepared. These samples employ activated carbon having different conditions of functional group amount D from each other, and rates of changes in DCR before and after a load test are evaluated. The rate of changes in DCR is a ratio of a difference between DCR after the load test and an initial DCR with respect to the initial DCR. The physical properties of the activated carbon of each sample are shown in Table 1. The relationships between functional group amount D and the rates of changes in DCR of each sample shown in Table 1 are plotted in FIG. 3.

Each of the capacitors used in this test includes the capacitor element that is formed by winding a positive electrode, separator, and negative electrode together. These electrode include the electrode layers formed of the compositions described in the embodiment. The positive electrode has a length of 660 mm and a width of 39 mm. The negative electrode has a length of 680 mm and a width of 39 mm. The capacitor per se, including the outer case, has a diameter of 18 mm and a length of 50 mm. The load test is done in an atmosphere of 70° C. for 1000 hours, and a voltage of 2.7V is continuously applied to the capacitor.

In this test, multiple solvents such as γ-butyl lactone (GBL) and propylene carbonate (PC) are used in each sample. DEDMA+$BF_4^-$ is used as a solute, and a concentration of the electrolyte in each solvent is 1.0 mol/liter.

TABLE 1

|   | average pore diameter (nm) | F (meq/g) | S (nm$^2$) | D (meq/g/nm$^2$) | ΔDCR(%) GBL | ΔDCR(%) PC |
|---|---|---|---|---|---|---|
| A | 3.05 | 0.15 | 7.32 | 0.021 | 47 | 97 |
| B | 2.29 | 0.10 | 4.13 | 0.024 | 76 | 69 |
| C | 2.10 | 0.09 | 3.37 | 0.027 | 39 | 280 |
| D | 2.57 | 0.18 | 5.20 | 0.034 | 43 | 184 |
| E | 1.15 | 0.10 | 1.03 | 0.097 | 59 | 512 |
| F | 1.05 | 0.45 | 2.98 | 0.152 | 63 | 302 |
| G | 1.90 | 0.52 | 2.85 | 0.182 | 960 | 171 |
| H | 1.48 | 0.35 | 1.72 | 0.203 | 1376 | 675 |

Figure 3:
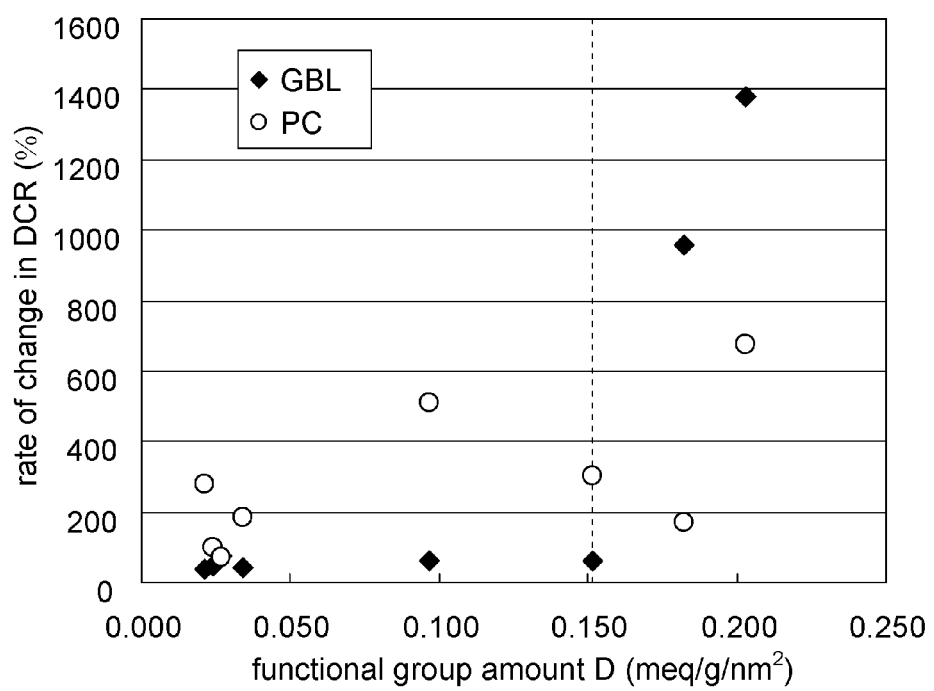
FIG. 3 shows a graph showing a relationship between an entire functional group amount D at an average sectional area of pores of this activated carbon and rates of change in direct current resistance (DCR) before and after a load test on the capacitor using the activated carbon.

As Table 1 and FIG. 3 clearly show, smaller changes in DCR after the test are observed in samples A-F of which functional group amount D is 0.152 or less and that include a solvent containing a lactone compound, while greater changes in DCR after the test are observed in samples G, H of which functional group amount D is greater than 0.152 and that include the solvent containing the lactone compound.

Furthermore, the relationship between the rate of change in DCR and functional group amount D of each solvent of samples A-H is compared with each other. In the case of using GBL as the solvent, the rate of change in DCR becomes greater when functional group amount D exceeds a specified value shown with a broken line in FIG. 3. In the case of using PC as the solvent, no remarkable tendency is observed. As discussed above, the rate of change in DCR starts changing remarkably at a specific point as a borderline. This phenomenon is intrinsic to GBL that is a lactone compound. The difference in the foregoing observations is caused by difference in chemical and mechanical compatibilities of the surface functional groups due to different compositions of the electrolytes. Although specific data is not exhibited here, in the case of using γ-valerolactone or a mixture of γ-butyrolactone and γ-valerolactone as the solvent, the rate of change in DCR shows a similar tendency to that of the solvent using GBL.

The foregoing test proves that functional group amount D (meq/g/nm$^2$) of the activated carbon forming at least one of the positive electrode and the negative electrode of the capacitor in accordance with the embodiment using the electrolyte of which solvent contains the lactone compound should be not greater than 0.152 in order to prevent the characteristics of the capacitor from degrading during repeated charges/discharges.

In the foregoing description, capacitor element 1 including a wound-type electrode structure is taken as an example; however, the capacitor element is not limited to this electrode structure. For instance, a positive electrode, negative electrode, and separator, each of which is in a thin plane shape, are layered to form a capacitor element, and the activated carbon is used therein.

In this embodiment, positive electrode 2 and negative electrode 3 are polarized electrodes, and they are used in an electric double layer capacitor. However, the present disclosure is not limited to this structure. For instance, use of a polarized electrode as the positive electrode, and use of an electrode capable of storage/release of lithium ions as the negative electrode will allow the activated carbon described in the present disclosure to be used in the positive electrode. In other words, at least one of the positive electrode and the negative electrode can contain the foregoing activated carbon.

As discussed previously, the capacitor described in this disclosure uses the electrolyte containing the lactone compound, thereby prolonging the service life, and therefore the reliability of the capacitor can be improved. This capacitor can thus charge/discharge for a long-time in a harsh environment, so that the market expects that this capacitor be used as an electric storage device in the products, such as cars, subjected to a harsh environment.

What is claimed is:

1. A capacitor comprising:
a capacitor element including a positive electrode and a negative electrode that faces the positive electrode; and
an electrolyte containing a lactone compound, with which the capacitor element is impregnated, wherein:
at least one of the positive electrode and the negative electrode contains activated carbon, and
entire surface functional group amount D (meq/g/nm$^2$) in an average sectional area of pores of the activated carbon calculated by the following equation is 0.152 or less:

$D=F/S$, where F represents an entire surface functional group amount per unit weight (meq/g) of the activated carbon, and S represents an area (nm$^2$) of a circle of which diameter is an average diameter of the pores of the activated carbon.

2. The capacitor according to claim 1, wherein the lactone compound is formed of at least one of γ-butyrolactone and γ-valerolactone.

3. The capacitor according to claim 1, wherein a value of the F is obtained based on an amount of $C_2H_5ONa$ reacting on the activated carbon.

4. The capacitor according to claim 1, wherein the electrolyte contains a quaternary ammonium salt.

* * * * *